(12) United States Patent
Chang et al.

(10) Patent No.: US 6,732,248 B2
(45) Date of Patent: May 4, 2004

(54) SYSTEM AND METHOD FOR GHOST OFFSET UTILIZATION IN SEQUENTIAL BYTE STREAM SEMANTICS

(75) Inventors: Joon Chang, Austin, TX (US); Amy Yi-mei Shi, Austin, TX (US)

(73) Assignee: International Business Machines, Corporation, Armonk, NY (US)

( * ) Notice: Subject to any disclaimer, the term of this patent is extended or adjusted under 35 U.S.C. 154(b) by 475 days.

(21) Appl. No.: 09/893,426

(22) Filed: Jun. 28, 2001

(65) Prior Publication Data

US 2003/0005217 A1 Jan. 2, 2003

(51) Int. Cl.[7] .............................................. G06F 12/04
(52) U.S. Cl. ...................................... 711/201; 711/220
(58) Field of Search ................................ 711/201, 202, 711/220; 710/33; 707/4, 101

(56) References Cited

U.S. PATENT DOCUMENTS

| 5,727,090 | A |   | 3/1998  | Yellin ........................ 382/245   |
| 5,890,169 | A | * | 3/1999  | Wong et al. ................ 707/206      |
| 5,895,503 | A |   | 4/1999  | Belgard ...................... 711/202    |
| 5,928,352 | A |   | 7/1999  | Gochman et al. ........... 712/200        |
| 5,940,868 | A |   | 8/1999  | Wagner ...................... 711/203     |
| 5,946,716 | A |   | 8/1999  | Karp et al. .................. 711/207    |
| 5,960,466 | A |   | 9/1999  | Belgard ...................... 711/213    |
| 5,963,984 | A |   | 10/1999 | Garibay, Jr. et al. ........ 711/208      |
| 5,978,795 | A |   | 11/1999 | Poutanen et al. .............. 707/3      |
| 6,006,312 | A |   | 12/1999 | Kohn et al. .................. 711/210    |
| 6,075,545 | A |   | 6/2000  | De Bonet et al. ........... 345/517       |
| 6,081,301 | A |   | 6/2000  | Limberg ...................... 348/614    |
| 6,088,747 | A |   | 7/2000  | Cotugno et al. .............. 710/74      |
| 6,374,250 | B2 | * | 4/2002 | Ajtai et al. .................. 707/101   |

* cited by examiner

*Primary Examiner*—Gary Portka
(74) *Attorney, Agent, or Firm*—Joseph T. Van Leeuwen; Scott A. Schmok; Diana L. Roberts (57) ABSTRACT

A system and method for releasing storage space at the beginning of a byte stream while maintaining sequential byte stream semantics is provided. A ghost offset is initialized when a file is instantiated or opened. When information is deleted at the beginning of the sequential byte stream, the ghost offset is incremented in the amount of the number of bytes being deleted. The ghost offset continues to increment while the file is opened and information is being deleted at the beginning of the data stream. The virtual offset is the ghost offset added to the real offset of a particular entry in the data stream which maintains sequential byte stream semantics. When the file is closed, storage space is released in the amount of the ghost offset. Applications are provided with virtual offsets corresponding to data locations which are converted to real offsets for accessing data in the data stream.

20 Claims, 6 Drawing Sheets

SYSTEM AND METHOD FOR GHOST OFFSET UTILIZATION IN SEQUENTIAL BYTE STREAM SEMANTICS

BACKGROUND OF THE INVENTION

1. Technical Field

The present invention relates in general to a method and system for using a ghost offset to track the truncation of information. Still more particularly, the present invention relates to a method and system for releasing storage space while keeping sequential byte stream semantics.

2. Description of the Related Art

Operating systems, such as the UNIX operating system, use a file system for managing files. UNIX uses a hierarchical directory structure for organizing and maintaining files. There are three types of files in the UNIX file system: (1) ordinary files, which may be executable programs, text, or other types of data used as input or produced as output from some operation; (2) directory files, which contain lists of files in directories outlined above; and (3) special files, which provide a standard method of accessing input/output devices. The UNIX operating system organizes files into directories which are stored in a hierarchical tree-type configuration. At the top of the tree is the root directory which is represented by a slash (/} character. The root directory contains one or more directories. These directories, in turn, may contain further directories containing user files and other system files.

File system objects are viewed as sequential byte stream entities. A sequential byte stream is a series of bytes positioned next to each other. Data files consist of sequential byte streams. Directories, however, consist of a set of entries. Directory operations by applications are typically to access each entry randomly, or to access the entire directory when the application chooses to list or delete the directory. An example of an application is a word processing program or file manager program. In either case, the directory is implemented as a sequential byte stream. The position of an entry is reported to the application by an offset which specifies the distance from the start of the directory to the entry. For example, if the start of a sub-directory is twenty bytes from beginning of the start of the directory being viewed, the offset reported to the application is twenty.

A challenge found with existing art is that it prevents the release of storage space after a deletion from the front of the file object. For a directory, entries at the front of the file object can be deleted. However, the standard sequential byte stream implementation still prevents releasing data space associated with deleted entries in that segment. If the data space for the deleted entries is released, the offset of the remaining entries decreases by the size of the preceding deleted entries and thus invalidates the offsets of the remaining entries reported to the application.

Retaining data space of deleted entries of a directory results in less efficient storage utilization. More serious challenges occur if the underlying directory implementation is based on an efficient balanced tree data structure rather than a sequential data structure. In a balanced tree data structure, deleted entries must be removed to avoid complications of tree searches complications with maintaining the balanced tree. Balanced tree data structures are used as a method for quickly searching and retrieving information.

What is needed, therefore, is a way to release storage space at the beginning of a sequential byte stream after a deletion and still maintain sequential byte stream semantics.

SUMMARY

It has been discovered that providing a new mechanism called a ghost offset to maintain the semantics of the original "offset" of the sequential byte stream allows the release the data space associated with the deleted entries when truncation at or from the front of the directory file object. The ghost offset is used for balanced tree as well as sequential byte stream implementations. Sequential file abstraction for the application viewpoint is maintained while allowing efficient underlying implementation.

When a file object is instantiated or opened in memory, a ghost offset, G, is associated with the file object. The ghost offset is initialized to zero, and tracks the length of a truncated segment from the front of the file object since the instantiation. Whenever the leftmost entries of the file object are deleted from the front, the data space of the deleted entries is removed from the file object and the ghost offset G is incremented by the size of the entry. The underlying implementation assigns a real offset, R, to an entry by computing its current position from the start of the actual remaining file object. For example, if the position of an entry is twenty bytes away from the beginning of the data stream, the real offset is twenty. If the first ten bytes of the data stream are released, the real offset is now ten for the same entry. The offset communicated between the application and the underlying implementation is the virtual offset, V, which is the summation of the ghost offset, G, and the real offset, R. When the application specifies an offset, V, to be instantiated or opened, the real offset is calculated by subtracting the ghost offset from the received virtual offset. When the file is closed, storage space is released at the beginning of the byte stream in the amount of G, and the ghost offset is discarded.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
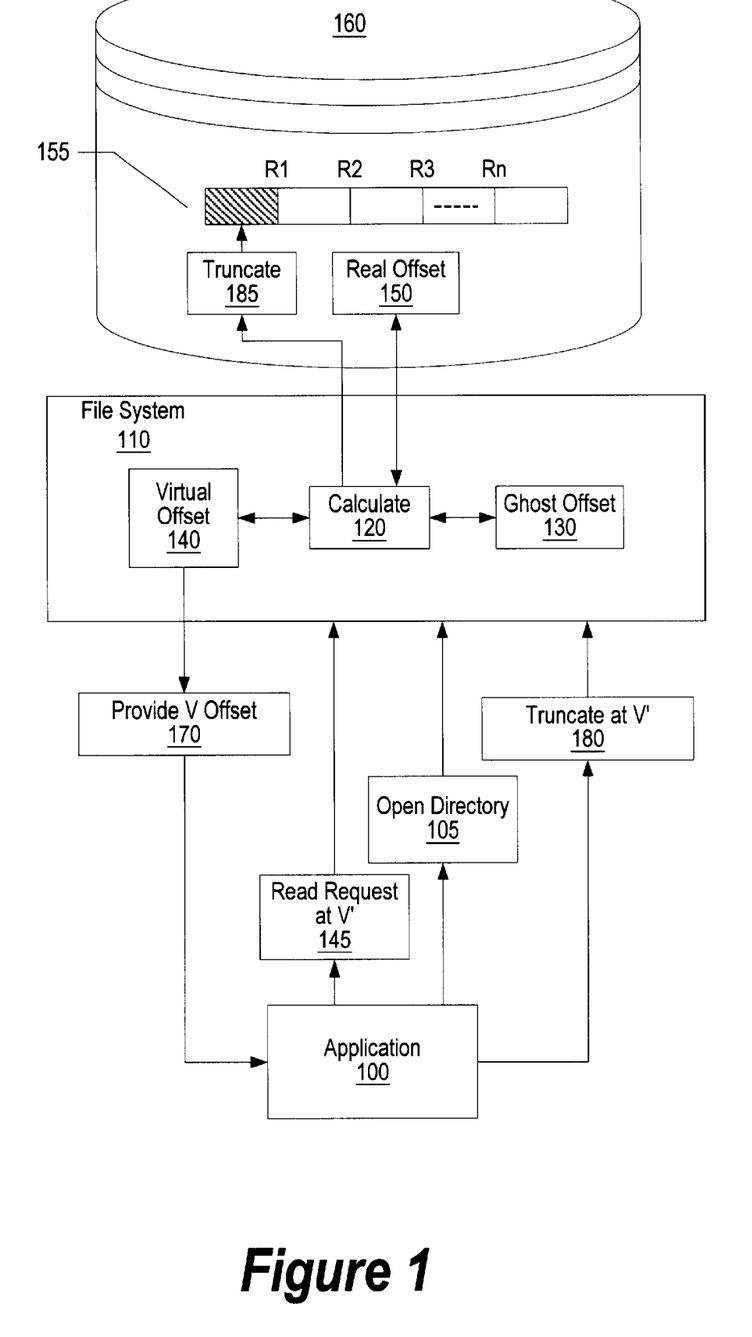
FIG. 1 is a high level diagram showing a process truncating a directory.

FIG. 1 is a high level diagram showing an application truncating a directory. Application 100 sends open directory 105 request to file system 110. The requested directory resides in non-volatile storage device 160. An example of a non-volatile storage device is a disk drive or other computer operable media that retains storage values when power is removed from the device. When file system 110 receives the request to open the directory, calculate process 120 reads real offset 150 that corresponds with the requested directory. At the start of a file being opened, ghost offset is initialized to zero. Calculate 120 computes virtual offset 140 by adding real offset 150 to ghost offset 130. Since the ghost offset is zero at the beginning of instantiation, virtual offset 140 equals real offset 150. Virtual offset 140 is the virtual location of the beginning of the requested sequential data stream. The virtual offset is provided (step 170) to application 100 so the application can use a pointer to the location of the requested file. Application 100 sends read request V' (145) to file system 110. In one embodiment, the application reads file information prior to truncation. In other embodiments, the application simply truncates information without reading the file information. V' can be the same virtual offset (V) provided by the file system, or it can be a different virtual offset corresponding to information that is not at the beginning of sequential data stream 155. File system 110 calculates the real offset of the requested read by subtracting the ghost offset from the V' offset.

Application 100 can send truncate request 180 to file system 110 in order to truncate data beginning at V' from sequential data stream 155. File system 110 calculates the real offset by subtracting the ghost offset from the V' offset, and truncates data stream 155 accordingly (step 185). In this example, V' is the first block of data (i.e., a directory) in sequential data stream 155. In other embodiments, V' could be in the middle or at the end of the sequential data stream.

Figure 2A:
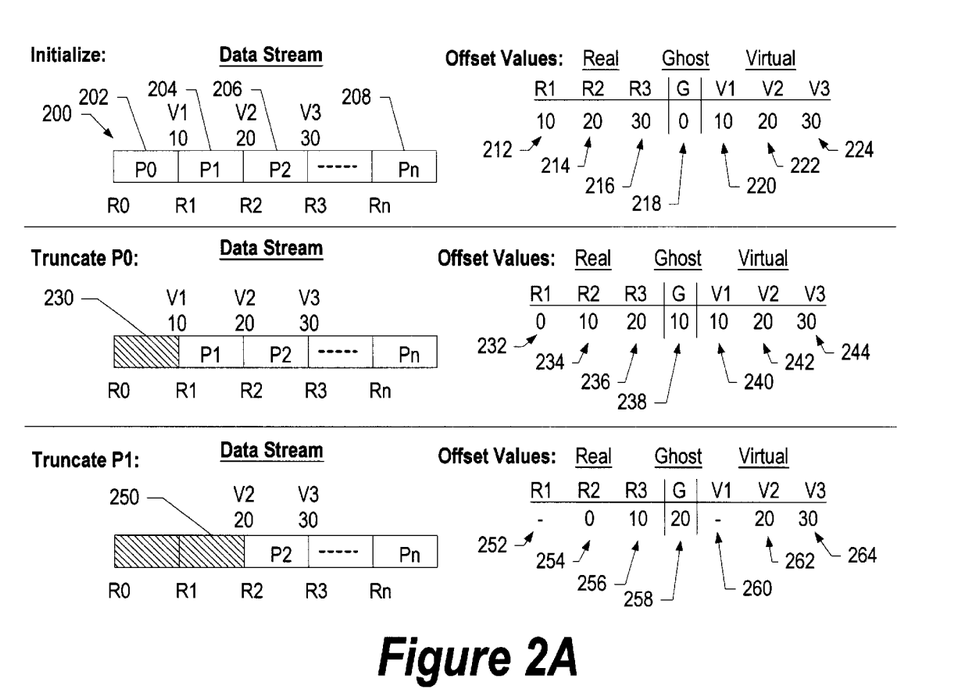
FIG. 2A is a diagram showing a ghost offset incrementing as pages are truncated.

FIG. 2A is a diagram showing a ghost offset incrementing as pages are truncated. Sequential data stream 200 includes n pages. P0 (202) is the first page, P1 (204) is the second page, P2 (206) is the third page, and Pn (208) is the last page. The beginning of each page has a real offset, R, and a virtual offset, V. Real offsets are the true location of the beginning of corresponding pages. R1 (212) is the real offset location of the beginning of page 1. In the top example, R1 is offset by 10 bytes. R2 (214) is the real offset location of the beginning of page. In the top example, R2 is offset by 20. R3 (216) is the real offset location of the beginning of page 3. In the top example, R3 is offset by 30. Virtual offsets are provided to applications, and are consistent while data is truncated at the beginning of a data stream. Virtual offsets are calculated by adding the ghost offset to the real offset. In the top example, the ghost offset is initialized to zero (218), as is the case when a file is instantiated. Therefore, V1 (220) is the same as R1 (212) which is 10 . V2 (222) is the same as R2 (214) which is 20. V3 (224) is the same as R3 (216) which is 30.

The middle example in FIG. 2A shows P0 being truncated (230). With P0 being truncated, the real offsets shift by the amount of P0. Therefore, R1 (232) becomes 0, R2 (234) becomes 10, and R3 (236) becomes 20. The ghost offset increments by the amount of data deleted at the beginning of the data stream. Therefore, the ghost offset is now 10 (238). Virtual offsets are unaffected by deleting P0 because virtual offsets are the summation of the real offset and the ghost offset. Therefore, V1 (240) is still 10, V2 (242) is still 20, and V3 (244) is still 30.

The bottom example of FIG. 2A shows P1 being truncated (250). With P1 truncated, the real offsets shift by the amount of P1. Therefore, R1 (252) is not existent, R2 (254) becomes 0, and R3 (256) becomes 10. The ghost offset increments by the amount of data deleted for P1. Therefore, the ghost offset increments to 20 (258). Virtual offset locations are unaffected by deleting P1 because virtual offsets are the summation of the real offset and the ghost offset. However, V1 (260) is no longer existent due to P1 being removed. V2 (262) is still 20, and V3 (264) is still 30.

Figure 2B:
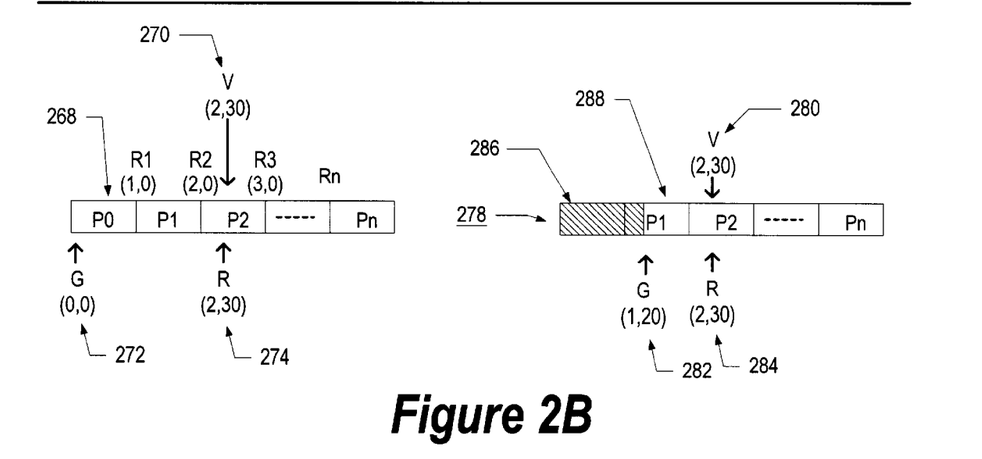
FIG. 2B is a diagram showing how the ghost offset manages truncations that are not in full pages.

FIG. 2B is a diagram showing the ghost offset managing truncations that are not in full pages. In the example to the left in FIG. 2B, sequential data stream 268 includes multiple pages. Real offset 274 is at the $30^{th}$ entry on the second page (2,30). Ghost offset 272 is initialized to zero, as is the case when a file is instantiated. Since Ghost offset 272 is zero, virtual offset 270 is the same value as its corresponding real offset 274, which is (2,30). In the example to the right of FIG. 2B, sequential data stream 278 is truncated at the front in the amount of one page and twenty entries (286). Ghost offset 282 is incremented by the amount of data that is deleted and is now (1,20). Real offset 284 becomes (1,30)= V−G=(2, 30)−(1,20). When sequential data streams are segmented in pages, information is released on a page by page basis. Therefore, P0 is released but the first twenty entries of P1 288 are not released. Virtual offset 280 is calculated by adding the number of pages of ghost offset 282 to real offset 284. Virtual offset 288 remains at (2,30) because it is real offset 284 plus one page from ghost offset 282. V=G+R, when G and R do not refer to the same page, the index of G is ignored and only the page number of G is used for calculations.

Figure 3:
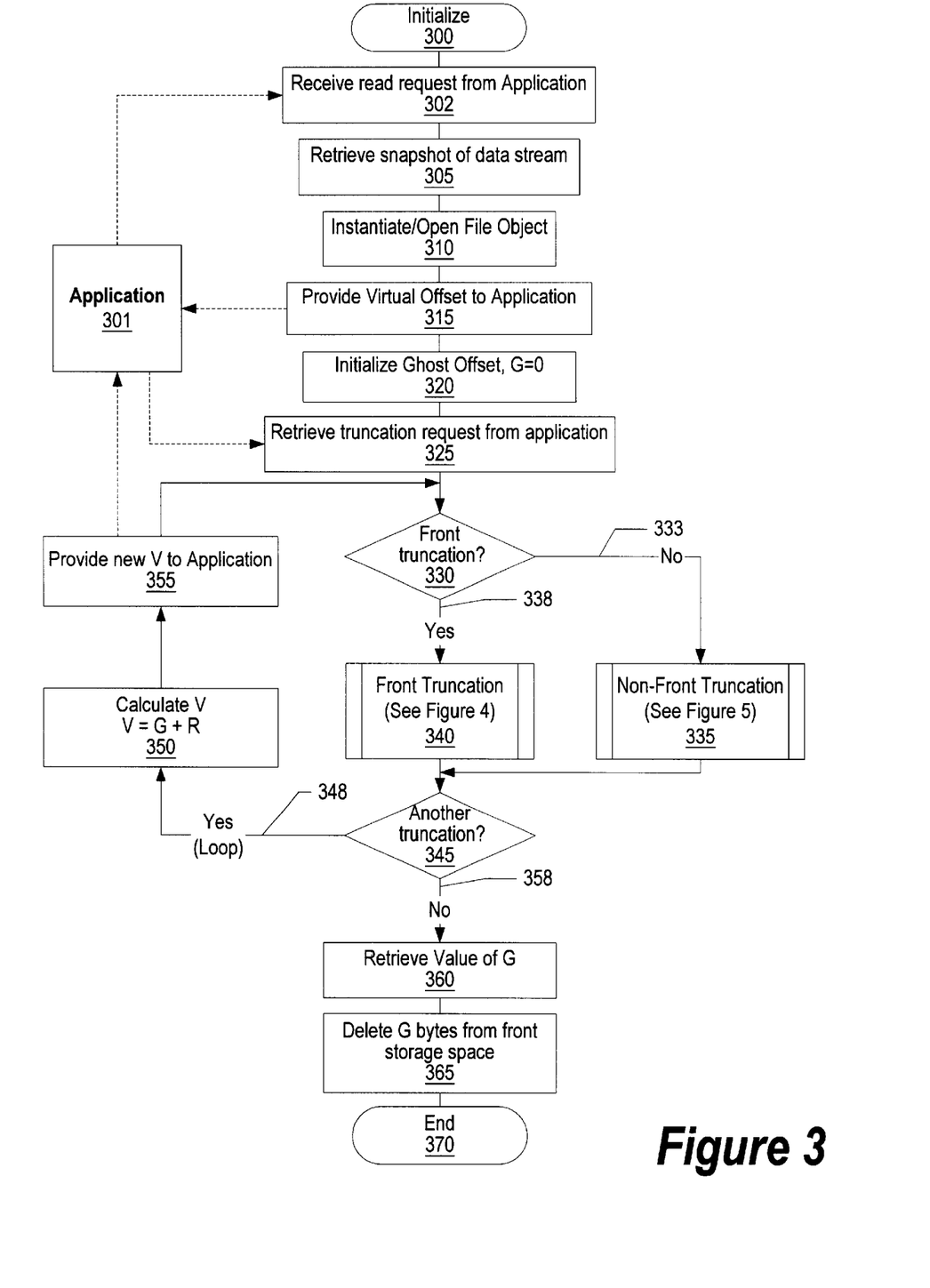
FIG. 3 is a flowchart showing the truncation process and the release of storage.

FIG. 3 is a flowchart showing the truncation process and the release of storage. Initialization commences at 300, whereupon a request is received (step 302) from application 301. Examples of requests received from applications are a request to read directory information, file information, or to truncate a directory. A snapshot of the requested data is retrieved (step 305), whereupon the file object is instantiated or opened (step 310). The system provides a virtual offset to application 301 corresponding to the location of the requested information (step 315). At this point in the process, the virtual offset is the same as the real offset. The ghost offset initializes to zero (step 320) and waits for a truncation request from application 301. Once the truncation request is received (step 325), a determination is made as to whether the truncation request is at the front of the data stream or somewhere else in the data stream (decision 330). If the truncation request is not at the front of the data stream, decision 330 branches to "no" branch 333 whereupon non-front truncation is processed (pre-defined process block 335, see FIG. 5 for further details). On the other hand, if the real truncation request is at the front of the data stream, decision 330 branches to "yes" branch 338 whereupon front truncation is processed (pre-defined process block 340, see FIG. 4 for further details).

Following either truncation process (335 or 340), a determination is made as to whether another truncation request is received (decision 345). If another truncation request is received, decision 345 branches to "yes" branch 348 which loops back to handle the next truncation request. During "yes" branch 348, the virtual offset is calculated by adding the ghost offset to the real offset (step 350). The new virtual offset is provided to the application (step 355) whereupon the system loops back to decision 330 and determines whether the truncation request is at the front of the data stream. This looping continues until there are no more truncations to perform, whereupon decision 345 branches to "no" branch 358. The cumulated ghost value is retrieved (step 360). The front of the data stream storage space is released (i.e., deleted) by the amount of the ghost offset (step 365), whereupon processing ends at 370.

Figure 4:
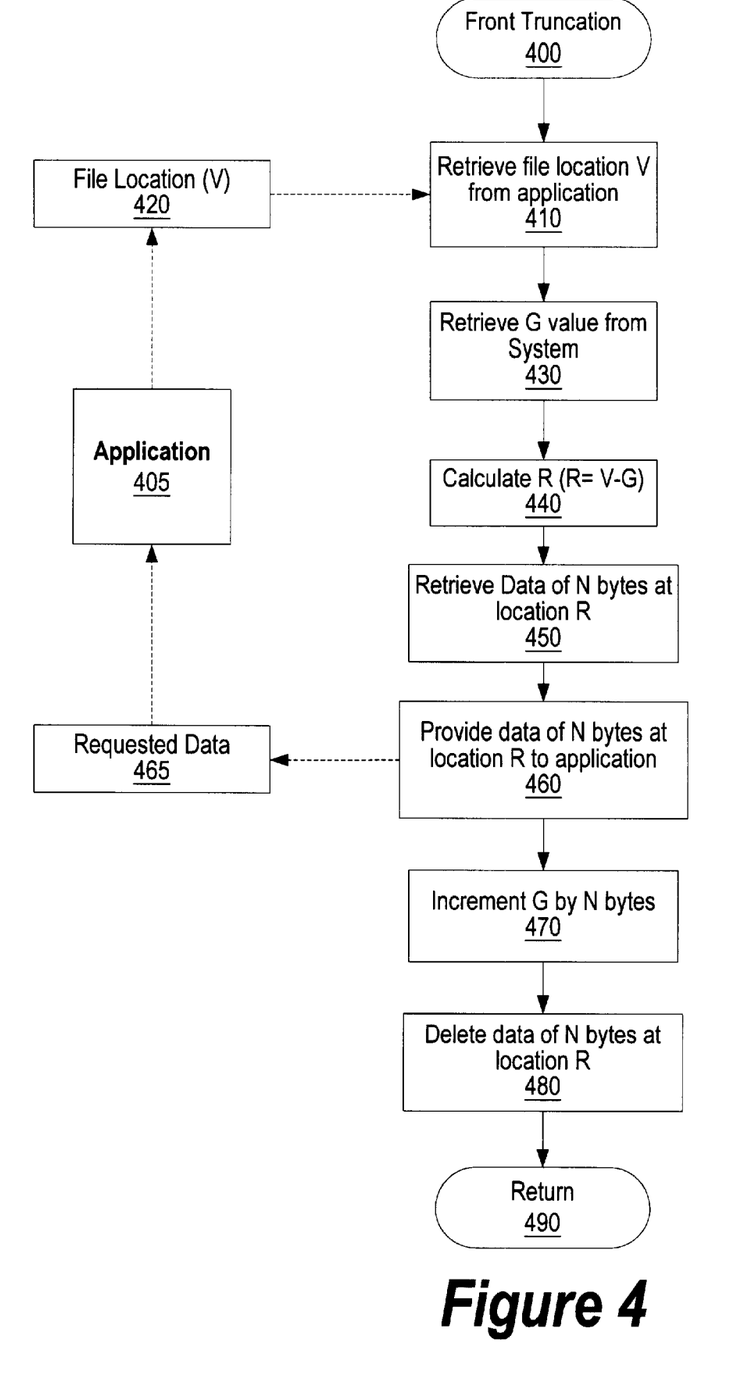
FIG. 4 is a flowchart showing the front truncation process.

FIG. 4 is a flowchart showing the front truncation process. Front truncation processing commences at 400, whereupon virtual offset 420 of the requested file to be truncated is retrieved (step 410) from application 405. The ghost offset is retrieved from the system (step 430), whereupon the real offset location of the file is calculated (step 440). When a file is first opened or instantiated, the real and virtual offsets are the same and the ghost offset is initialized to zero.

The real offset is calculated by subtracting the ghost offset from the virtual offset retrieved from the application. Data is retrieved at the real offset location in the amount of bytes (N) requested by the application (step 450). Requested data 465 is provided to application 405 (step 460), and the ghost offset is incremented by the amount of bytes N (step 470). In some embodiments, the application does not request to read the data, and only delete it. In these cases, steps 450 and 460 are omitted. The data is deleted (step 480), and processing returns at 490. During subsequent invocations of front truncation process 400, the ghost value (G) is retained to determine the virtual offsets and real offsets.

Figure 5:
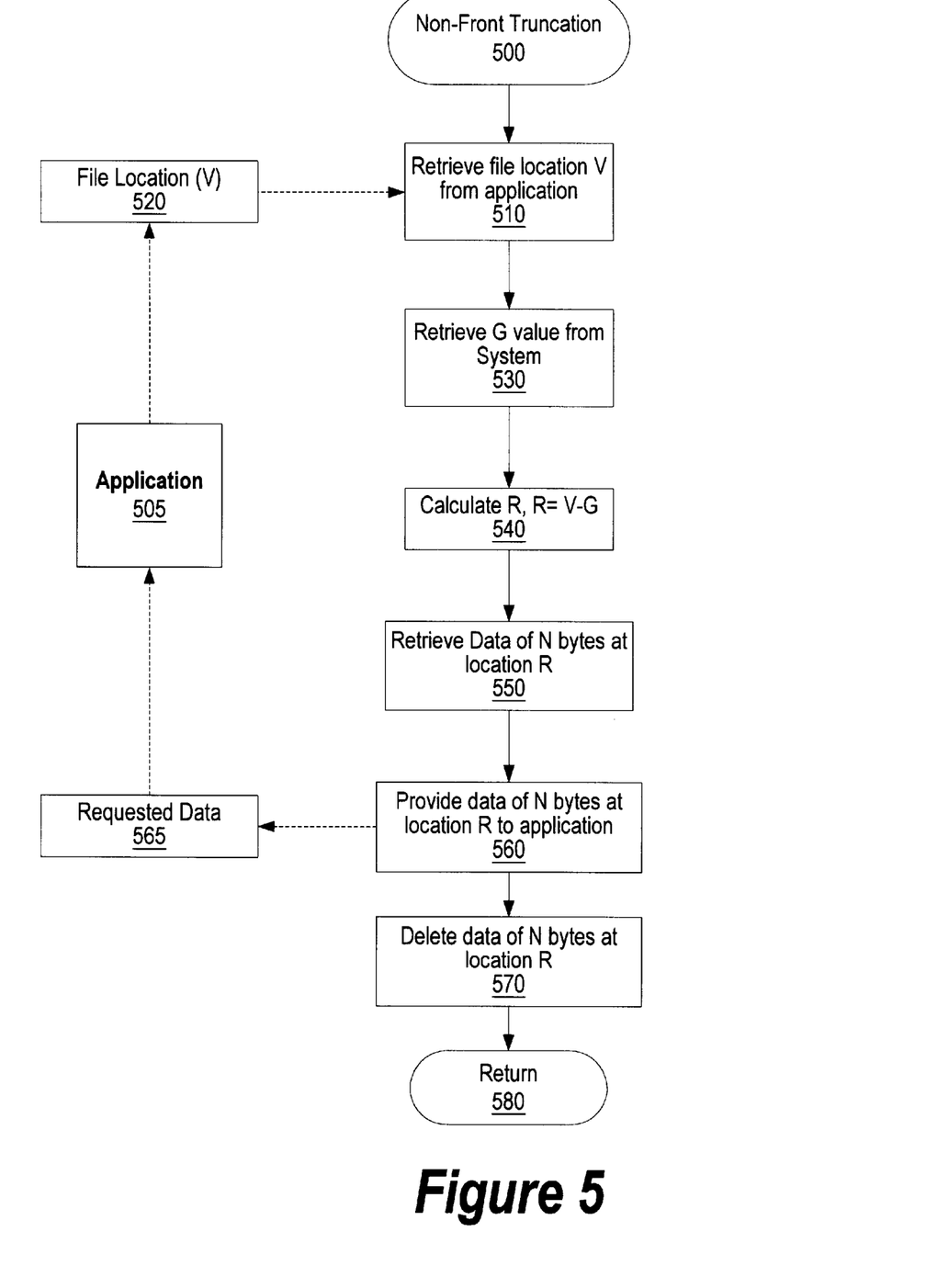
FIG. 5 is a flowchart showing the truncation process at an area not in the front of a data stream.

FIG. 5 is a flowchart showing the truncation process of an area that is not in the front of a data stream. Non-front truncation processing commences at 500, whereupon virtual offset 520 of the requested file to be truncated is retrieved (step 510) from application 505. The ghost offset is retrieved from the system (step 530), whereupon the real offset location of the file is calculated (step 540). When a file is first opened or instantiated, the ghost offset is initialized to zero and the virtual offset is initialized to equal the real offset.

The real offset is calculated by subtracting the ghost offset from the virtual offset retrieved from the application. Data is retrieved at the real offset location in the amount of bytes (N) requested by application 505 (step 550). The data is provided to application 505 (step 560). In one embodiment, the application does not request to read the data, and only delete it. In these cases, steps 550 and 560 are omitted. Ghost offsets prior to the truncation are not incremented. The data is deleted (step 570), and processing returns at 580. In one embodiment, an array of ghost offsets can be used to track truncations at various parts of the data stream. For example, ghost offsets G1, G2, G3, etc. can be associated with real offsets R1, R2, R3, etc. When a directory is truncated in the middle of the data stream, directory 2 for example, ghost offsets at and after the truncation would be incremented (i.e., G2, G3, etc. are incremented, but G1 is not).

Figure 6:
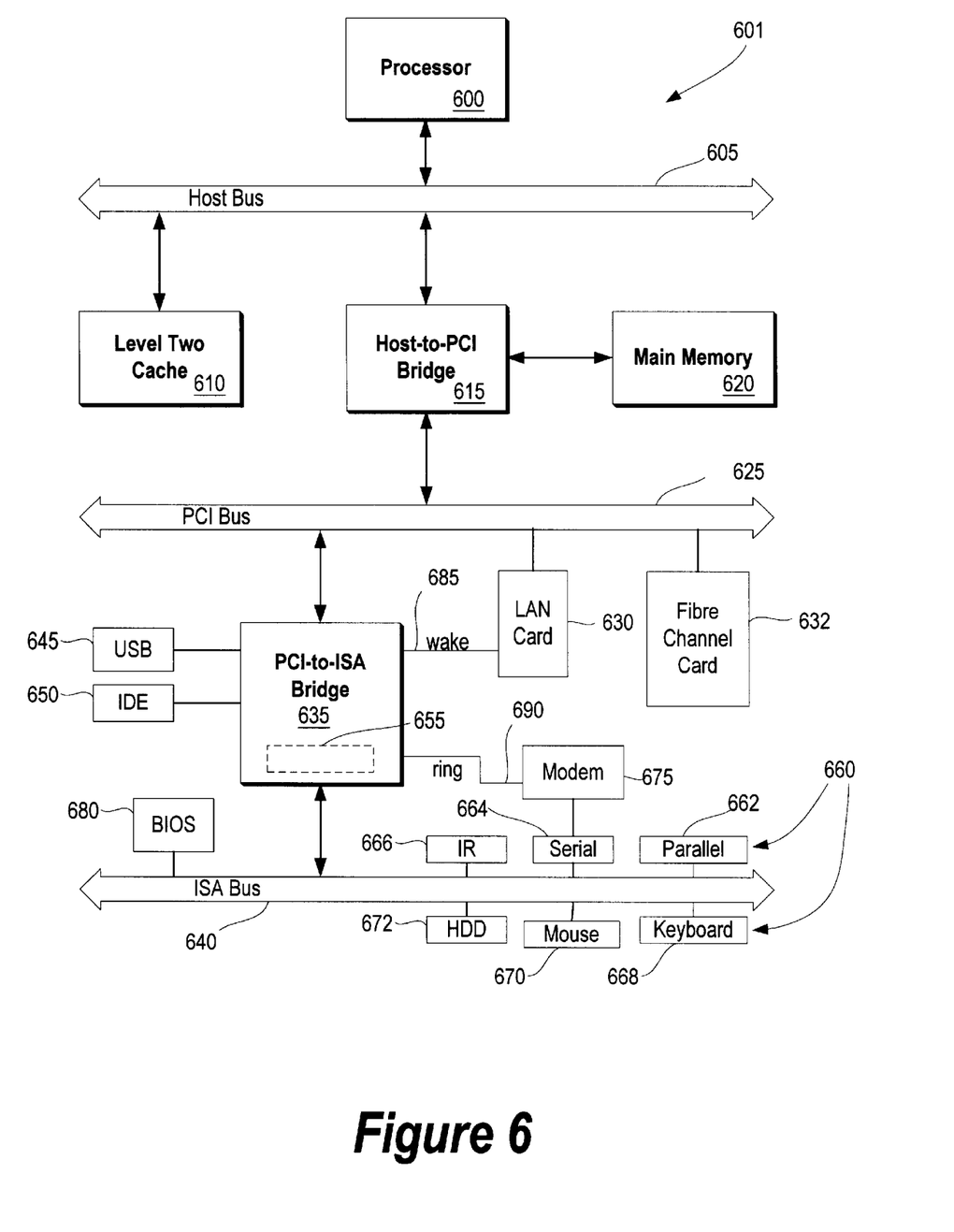
FIG. 6 is a block diagram of an information handling system capable of performing the present invention.

FIG. 6 illustrates information handling system 601 which is a simplified example of a computer system capable of performing the copy processing described herein. Computer system 601 includes processor 600 which is coupled to host bus 605. A level two (L2) cache memory 610 is also coupled to the host bus 605. Host-to-PCI bridge 615 is coupled to main memory 620, includes cache memory and main memory control functions, and provides bus control to handle transfers among PCI bus 625, processor 600, L2 cache 610, main memory 620, and host bus 605. PCI bus 625 provides an interface for a variety of devices including, for example, LAN card 630. PCI-to-ISA bridge 635 provides bus control to handle transfers between PCI bus 625 and ISA bus 640, universal serial bus (USB) functionality 645, IDE device functionality 650, power management functionality 655, and can include other functional elements not shown, such as a real-time clock (RTC), DMA control, interrupt support, and system management bus support. Peripheral devices and input/output (I/O) devices can be attached to various interfaces 660 (e.g., parallel interface 662, serial interface 664, infrared (IR) interface 666, keyboard interface 668, mouse interface 670, and fixed disk (FDD) 672) coupled to ISA bus 640. Alternatively, many I/O devices can be accommodated by a super I/O controller (not shown) attached to ISA bus 640.

BIOS 680 is coupled to ISA bus 640, and incorporates the necessary processor executable code for a variety of low-level system functions and system boot functions. BIOS 680 can be stored in any computer readable medium, including magnetic storage media, optical storage media, flash memory, random access memory, read only memory, and communications media conveying signals encoding the instructions (e.g., signals from a network). In order to attach computer system 601 another computer system to copy files over a network, LAN card 630 is coupled to PCI-to-ISA bridge 635. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one", and indefinite articles such as "a" or "an"; the same holds true for the use in the claims of definite articles.

What is claimed is:

1. A method for managing a data stream, said method comprising:
   identifying a truncation amount corresponding to the data stream;
   incrementing a ghost offset in response to the identification, the ghost offset being a cumulated truncation amount;
   determining one or more real offsets corresponding to one or more data areas within the data stream; and
   calculating one or more virtual offsets corresponding to the data areas based upon the real offsets and the ghost offset.

2. The method as described in claim 1 further comprising:
   removing the cumulated truncation amount of data from a front of the data stream.

3. The method as described in claim 1 further comprising:
   storing the ghost offset and the real offset in a file system area; and
   providing the virtual offset to an application that accesses the data stream managed by the file system.

4. The method as described in claim 1 further comprising:
   repeatedly incrementing the ghost offset in response to multiple truncation requests.

5. The method as described in claim 1 further comprising:
   identifying a plurality of truncation amounts corresponding to the data stream;
   assigning a ghost offset to each of the truncation amounts;
   determining one or more real offsets corresponding to each of the ghost offsets; and
   removing the plurality of truncation amounts from a plurality of areas within the data stream.

6. The method as described in claim 1 wherein the calculating includes adding the real offset to the ghost offset to determine the virtual offset.

7. The method as described in claim 1 wherein the identifying includes receiving a truncation request from an application.

8. An information handling system comprising:
   one or more processors;
   a memory accessible by the processors;
   one or more nonvolatile storage devices accessible by the processors, the nonvolatile storage devices including one or more files and a data stream associated with each of the files; and
   an data stream management tool to manage the data streams, the data stream management tool including:
      means for identifying a truncation amount corresponding to the data stream;
      means for incrementing a ghost offset in response to the identification, the ghost offset being a cumulated truncation amount;
      means for determining one or more real offsets corresponding to one or more data areas within the data stream; and
      means for calculating one or more virtual offsets corresponding to the data areas based upon the real offsets and the ghost offset.

9. The information handling system as described in claim 8 further comprising:
   means for removing the cumulated truncation amount of data from a front of the data stream.

10. The information handling system as described in claim 8 further comprising:
    means for storing the ghost offset and the real offset in a file system area; and
    means for providing the virtual offset to an application that accesses the data stream managed by the file system.

11. The information handling system as described in claim 8 further comprising:
    means for repeatedly incrementing the ghost offset in response to multiple truncation requests.

12. The information handling system as described in claim 8 further comprising:
    means for identifying a plurality of truncation amounts corresponding to the data stream;
    means for assigning a ghost offset to each of the truncation amounts;
    means for determining one or more real offsets corresponding to each of the ghost offsets; and
    means for removing the plurality of truncation amounts from a plurality of areas within the data stream.

13. The information handling system as described in claim 8 wherein the means for calculating includes means for adding the real offset to the ghost offset to determine the virtual offset.

14. A computer program product stored in a computer operable media for managing a data stream, said computer program product comprising:

means for identifying a truncation amount corresponding to the data stream;

means for incrementing a ghost offset in response to the identification, the ghost offset being a cumulated truncation amount;

means for determining one or more real offsets corresponding to one or more data areas within the data stream; and means for calculating one or more virtual offsets corresponding to the data areas based upon the real offsets and the ghost offset.

15. The information handling system as described in claim 14 further comprising:

means for removing the cumulated truncation amount of data from a front of the data stream.

16. The information handling system as described in claim 14 further comprising:

means for storing the ghost offset and the real offset in a file system area; and means for providing the virtual offset to an application that accesses the data stream managed by the file system.

17. The information handling system as described in claim 14 further comprising:

means for repeatedly incrementing the ghost offset in response to multiple truncation requests.

18. The information handling system as described in claim 14 further comprising:

means for identifying a plurality of truncation amounts corresponding to the data stream;

means for assigning a ghost offset to each of the truncation amounts;

means for determining one or more real offsets corresponding to each of the ghost offsets; and means for removing the plurality of truncation amounts from a plurality of areas within the data stream.

19. The information handling system as described in claim 14 wherein the means for calculating includes means for adding the real offset to the ghost offset to determine the virtual offset.

20. The information handling system as described in claim 14 wherein the means for identifying includes means for receiving a truncation request from an application.

\* \* \* \* \*